(12) United States Patent
Taxacher et al.

(10) Patent No.: US 9,751,807 B2
(45) Date of Patent: Sep. 5, 2017

(54) CONSUMABLE CORE FOR MANUFACTURE OF COMPOSITE ARTICLES AND RELATED METHOD

(75) Inventors: Glenn Curtis Taxacher, Simpsonville, SC (US); Peter de Diego, Saluda, NC (US); Paul Edward Gray, North East, MD (US); Philip Harold Monaghan, Hockessin, DE (US)

(73) Assignee: General Electric Company, Schenectady, NY (US)

( * ) Notice: Subject to any disclaimer, the term of this patent is extended or adjusted under 35 U.S.C. 154(b) by 864 days.

(21) Appl. No.: 13/586,930

(22) Filed: Aug. 16, 2012

(65) Prior Publication Data

US 2014/0048978 A1 Feb. 20, 2014

(51) Int. Cl.
| | |
|---|---|
| *B29C 33/52* | (2006.01) |
| *C04B 35/56* | (2006.01) |
| *C04B 35/563* | (2006.01) |
| *C04B 35/573* | (2006.01) |
| *C04B 35/653* | (2006.01) |

(52) U.S. Cl.
CPC ........ *C04B 35/5607* (2013.01); *C04B 35/563* (2013.01); *C04B 35/573* (2013.01); *C04B 35/653* (2013.01); *C04B 2235/404* (2013.01); *C04B 2235/421* (2013.01); *C04B 2235/428* (2013.01); *C04B 2235/616* (2013.01)

(58) Field of Classification Search
CPC . C04B 35/5607; C04B 35/563; C04B 35/573; C04B 35/653; C04B 2235/616; C04B 2235/404; C04B 2235/421; C04B 2235/428

USPC ....... 425/129.1, 130, 341, 342.1; 249/61, 62
See application file for complete search history.

(56) References Cited

U.S. PATENT DOCUMENTS

| | | | | | |
|---|---|---|---|---|---|
| 4,120,731 | A | * | 10/1978 | Hillig et al. ................... 501/90 |
| 4,141,948 | A | * | 2/1979 | Laskow et al. ............... 264/101 |
| 4,220,455 | A | * | 9/1980 | St. Pierre et al. .............. 51/295 |
| 4,238,433 | A | * | 12/1980 | Hillig et al. .................. 264/257 |
| 4,242,106 | A | * | 12/1980 | Morelock ....................... 51/307 |
| 4,247,304 | A | * | 1/1981 | Morelock ....................... 51/295 |
| 5,205,970 | A | * | 4/1993 | Brun et al. .................... 427/227 |
| 5,730,915 | A | * | 3/1998 | Cornie ......................... 264/29.1 |
| 5,758,405 | A | | 6/1998 | Bent et al. |
| 6,036,470 | A | * | 3/2000 | Basso et al. .................. 425/470 |
| 6,280,550 | B1 | | 8/2001 | Steibel et al. |
| 6,428,740 | B2 | | 8/2002 | Dunyak et al. |
| 6,979,377 | B2 | | 12/2005 | Bunis et al. |
| 7,118,085 | B2 | * | 10/2006 | Foser et al. ..................... 249/54 |
| 7,404,145 | B1 | * | 7/2008 | Franceschelli et al. ...... 715/736 |
| 7,628,942 | B1 | * | 12/2009 | Miller et al. ................. 264/29.1 |
| 7,658,781 | B1 | | 2/2010 | Waggoner et al. |
| 2003/0180538 | A1 | * | 9/2003 | Gray ............................. 428/408 |
| 2004/0067316 | A1 | * | 4/2004 | Gray et al. .................. 427/376.1 |
| 2004/0202896 | A1 | * | 10/2004 | Gray ............................. 428/698 |

(Continued)

*Primary Examiner* — Seyed Masoud Malekzadeh
(74) *Attorney, Agent, or Firm* — Ernest G. Cusick; Hoffman Warnick LLC

(57) ABSTRACT

Systems, methods and devices adapted to ease manufacture of composite articles (e.g., ceramic composite articles), particularly composite articles which include a hollow feature are disclosed. In one embodiment, a system includes: a consumable core formed to be disposed within an inner portion of a composite precursor, the consumable core adapted to convert into an infiltrant during a manufacturing process and infiltrate the composite precursor.

12 Claims, 4 Drawing Sheets

(56) References Cited

U.S. PATENT DOCUMENTS

| | | |
|---|---|---|
| 2008/0135202 A1* | 6/2008 | Lee et al. .......................... 164/28 |
| 2008/0135718 A1* | 6/2008 | Lee et al. .......................... 249/62 |
| 2009/0169738 A1* | 7/2009 | Gray et al. ..................... 427/227 |
| 2010/0121431 A1* | 5/2010 | Bertholdt ...................... 623/1.24 |
| 2013/0084189 A1* | 4/2013 | Diego ........................ 416/241 B |

* cited by examiner

CONSUMABLE CORE FOR MANUFACTURE OF COMPOSITE ARTICLES AND RELATED METHOD

GOVERNMENT LICENSE RIGHTS

This invention was made with Government support under contract number DE-FC26-05NT42643 awarded by the Department of Energy. The government has certain rights in the invention.

BACKGROUND OF THE INVENTION

The subject matter disclosed herein relates to composite materials and, more particularly, to consumable cores for use in the manufacture of composite articles and related methods.

Current methods of manufacturing ceramic composite articles (e.g., melt infiltration processes) include the use of a liquid-phase infiltrant material (e.g., silicon, silicon alloys, etc.) which is introduced into a volumetric material/composite precursor to form a composite article. During manufacturing, this infiltrant material is absorbed upon the exposed surfaces of the composite precursor, wicking into the composite precursor to form the composite article. In the manufacture of composite articles with hollow features, a typical process is to insert a removable core into the inner portions of the hollow composite precursor to form the cavity. The core is subsequently removed exposing inner surfaces of the composite precursor. The core removal must occur prior to melt infiltration to prevent the infiltrant from reacting with the core, bonding it to the composite article and preventing core removal. Some manufacturing methods include removable cores which are designed to be melted or burned out in a separate process following formation of the composite article. Some other manufacturers design composite articles with structural holes large enough to extract the removable cores from within the article. These methods may limit article design or performance, require additional steps in the manufacturing process, and/or expose components and portions of the composite article to thermal extremes which may damage or destroy the article.

BRIEF DESCRIPTION OF THE INVENTION

Methods and systems adapted to ease manufacture of composite articles are disclosed. In one embodiment, a system includes: a consumable core formed to be disposed within an inner portion of a composite precursor, the consumable core adapted to infiltrate the composite precursor and substantially vacate the inner portion of the composite precursor during a manufacturing process.

A first aspect of the disclosure provides an system including: a consumable core formed to be disposed within an inner portion of a composite precursor, the consumable core adapted to convert into an infiltrant during a manufacturing process and infiltrate the composite precursor.

A second aspect provides a system including: a composite precursor; a consumable core disposed within an inner portion of the composite precursor, the consumable core adapted to convert into an infiltrant during a manufacturing process and infiltrate the composite precursor; and an external feed connected to the consumable core via a wick, the external feed adapted to supply a flow of infiltrant material to the composite precursor.

A third aspect provides a method including: inserting a consumable core into a composite precursor; connecting an external feed to the composite article manufacturing system to supply additional infiltrant; adjusting at least one environmental condition about the composite article manufacturing system to infiltrate the composite precursor with a reinforcing material via the consumable core; consuming the consumable core; and readjusting the environmental condition.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
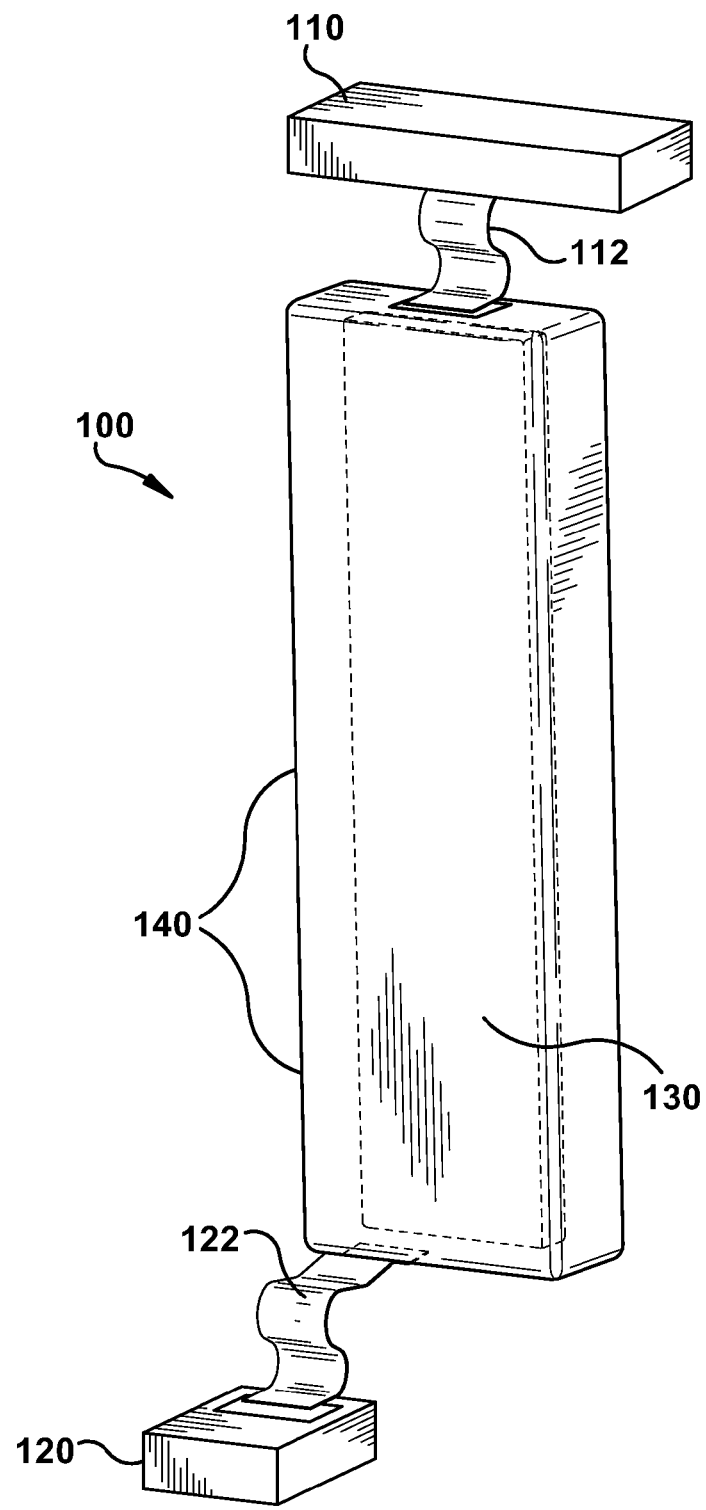
FIG. 1 shows a three-dimensional perspective view of a portion of a composite article manufacturing system according to an embodiment of the invention.

It is noted that the drawings of the disclosure are not necessarily to scale. The drawings are intended to depict only typical aspects of the disclosure, and therefore should not be considered as limiting the scope of the disclosure. It is understood that elements similarly numbered between the drawings may be substantially similar. Further, in embodiments shown and described with reference to the drawings, like numbering may represent like elements. Redundant explanation of these elements has been omitted for clarity. Finally, it is understood that the components of the drawings and their accompanying descriptions may be applied to any embodiment described herein.

DETAILED DESCRIPTION OF THE INVENTION

As indicated herein, aspects of the invention provide for systems, methods and devices adapted to ease manufacture of composite articles, particularly composite articles which include hollow features. These methods and systems use a consumable core adapted to fit within hollow features of a composite precursor, the consumable core applying infiltrant material to inner surfaces of the composite precursor and the core itself being consumed during the manufacturing process.

In the art of composite article manufacture, removable cores are often used to form inner surfaces of a composite precursor during fabrication. In these systems, following formation of the composite article the removable core must be withdrawn from within the composite article. Some systems use removable cores which may be melted or burned out of the composite article via exposure to a heat source, some other systems require that the composite article itself include a structural hole large enough to accommodate withdrawl of the removable core. However, these methods may limit article design or performance, require additional steps in the manufacturing process, and/or expose components and portions of the composite article to thermal extremes which may damage or destroy the article.

Embodiments of the current invention provide for systems, methods and devices which include the use of a consumable core in composite article manufacturing processes. The consumable core includes infiltrant precursor materials and is adapted to apply infiltrant material to inner surfaces of a composite precursor which includes a hollow feature. During manufacturing this consumable core is absorbed into the composite precursor (e.g., via absorption and capillary action, self-consuming from within the composite precursor and becoming a part of the composite article itself while vacating the interior of the hollow feature. This consumable core simplifies the manufacturing process and eliminates the need for burn outs, melt outs, dissolution, secondary assembly, structural holes or other methods of core removal as it forms composite articles whole.

Turning to the FIGURES, embodiments of composite article manufacturing methods and systems including consumable cores are shown, where the consumable cores may simplify manufacturing processes and increase the quality and design flexibility of composite articles. Each of the components in the FIGURES may be connected via conventional means, e.g., via a common conduit or other known means as is indicated in FIGS. 1-4. Specifically, referring to FIG. 1, a three-dimensional perspective view of a composite article manufacturing system 100 including a consumable core 130 within a composite precursor 140 (shown in phantom) is shown according to embodiments of the invention. Composite precursor 140 may be a porous carbonized composite precursor adapted to form a composite article 200 (shown in FIG. 2) upon absorption of infiltrant material (e.g., silicon with minor additions of secondary elements such as boron). Consumable core 130 is positioned within composite precursor 140 and may be connected to an external feed block 110 via a wick 112 (e.g., a permeable strip adapted to convey a molten mixture). Feed block 110 may supply additional portions of infiltrant material to consumable core 130 and may include a silicon block which is formed of solid, pressed, and/or sintered particulate. Consumable core 130 may further be connected to a drain 122 (e.g., a permeable strip adapted to convey a molten mixture) that may include a reservoir 120. During formation of a composite article (e.g., a melt infiltration process) composite article manufacturing system 100 may be subjected to a cycle of environmental conditions including fluctuations in heat and pressure. This cycle causes the infiltrant material (e.g., silicon) to pass from feed block 110 to consumable core 130, causing consumable core 130 to absorb into composite precursor 140. Excess portions of infiltrant material may flow to reservoir 120 via drain 122. In one embodiment, material from consumable core 130 may absorb into composite precursor 140 via capillary action.

Composite precursor 140 may fully contain (e.g., enclose) consumable core 130. Consumable core 130 may be pressed, cast, or machined out of metals, silicon or any other material now known or later developed. Pre-forming may shape consumable core 130 to complement contours of a hollow feature of composite precursor 140. A composition of consumable core 130 may include pure silicon or silicon plus alloying materials. In one embodiment, consumable core 130 may include Silicon and Boron. In one embodiment, consumable core 130 may include a sintered particulate and comprise about 95% silicon and about 5% boron. In another embodiment, consumable core 130 may include a composition of about 20% boron (B), 20% carbon (C), or 20% refractory metal (e.g., Ta, Zr, Nb, etc.) and a remainder of silicon. Consumable core 130 may be cast to a set size and shape prior to being internalized in composite precursor 140. It is understood that while consumable core 130 is described herein with regard to certain exemplary compositions and chemistries, these compositions and chemistries are merely illustrative and that any sintered chemistries, solid cast chemistries, and compositions now known or later developed may be included in consumable core 130.

During manufacturing, consumable core 130 may self-consume into composite precursor 140 forming composite article 200. In one embodiment, consumable core 130 may be completely consumed (e.g., internalized into composite article 200). In one embodiment, consumable core 130 and feed block 110 may comprise substantially the same material. Feed block 110 may include pure silicon, boron, silicon plus alloying materials, or any other materials now known or later developed.

Wick 112 and drain 122 may include similar materials and compositions, both being adapted to convey a molten mixture (e.g., molten silicon boron). In one embodiment, wick 112 and drain 122 may be interchangeable. Wick 112 and drain 122 may include inert materials which are woven or braided to form wick 112 and drain 122. In one embodiment, wick 112 and drain 122 may include woven carbon fiber.

Figure 2:
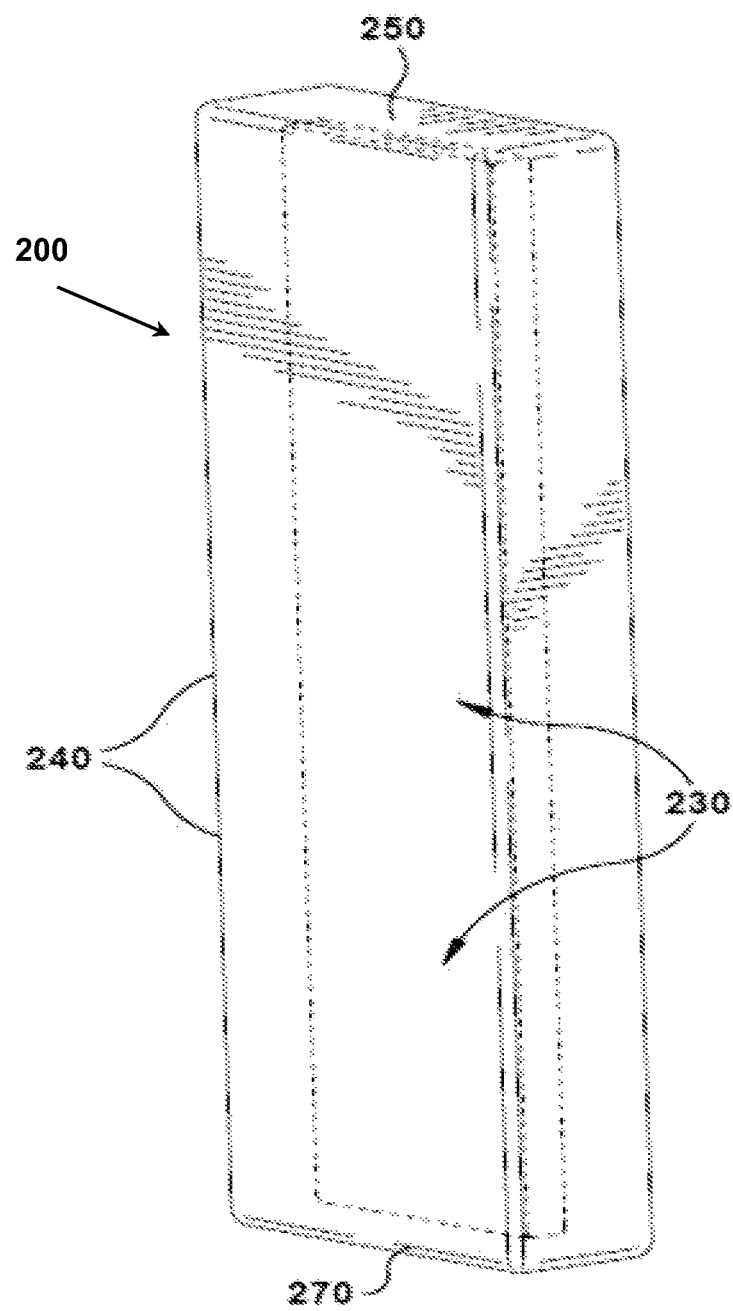
FIG. 2 shows a three-dimensional perspective view of a composite article according to an embodiment of the invention.

Turning to FIG. 2, a three-dimensional perspective view of portions of a composite article 200 is shown according to embodiments of the invention. In this embodiment, composite article 200 may include a composite body 240 defining an inner/hollow feature 230 (shown in phantom). Composite body 240 may have a substantially uniform material composition forming composite article 200. Inner/hollow feature 230 may be substantially devoid of consumable core 130 (shown in FIG. 1) which vacates inner/hollow feature 230 as it is cleanly consumed during the melt infiltration process. Composite body 240 may include a top surface 250 and a bottom surface 270 which seal inner/hollow feature 230.

Figure 3:
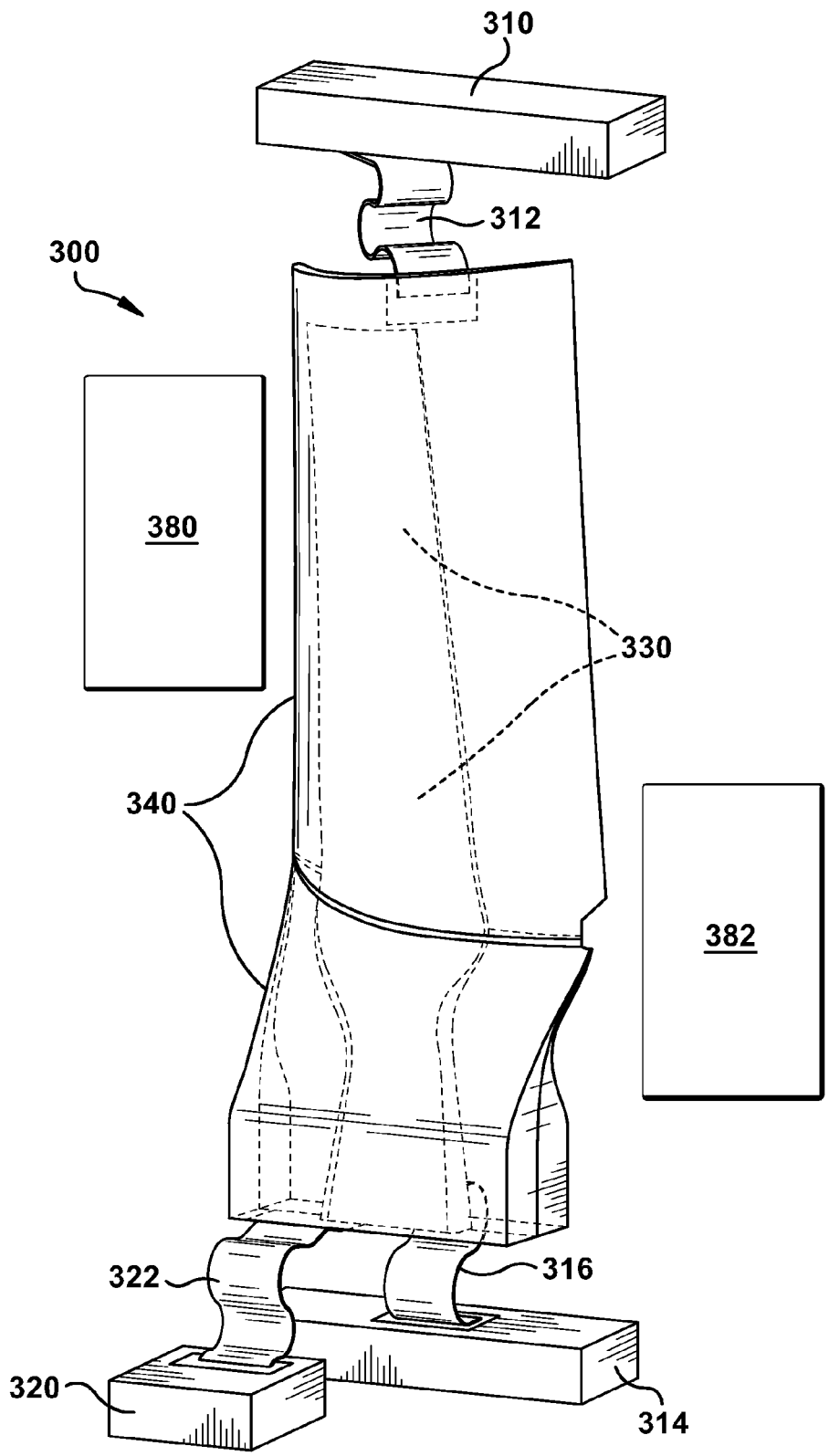
FIG. 3 shows a three-dimensional perspective view of a portion of a composite article manufacturing system according to an embodiment of the invention.

Turning to FIG. 3, a schematic three-dimensional perspective view of a composite article manufacturing system 300 including a consumable core 330 internalized within a composite precursor 340 (shown in phantom) is shown according to embodiments of the invention. In this embodiment, a set of external blocks 380 and 382 are disposed about composite precursor 340 and adapted to apply infiltrant material to external surfaces of composite precursor 340. Additional infiltrant blocks 380 and 382 may be similar in material composition to consumable core 330. Application and/or inclusion of additional infiltrant blocks 380 and 382 may depend on the volume of infiltrant needed to completely fill capillaries within composite precursor 340. Composite precursor 340 is connected to a first external feed block 310 via wick 312 and a second external feed block 314 via wick 316. During manufacturing processes (e.g., a melt infiltration process), a high temperature may be applied to composite article manufacturing system 300 inducing infiltrant material (e.g., matrix) to introduce into composite precursor 340 (e.g., volumetric material) via consumable core 330, external feed block 310, external feed block 314, external block 380 and/or external block 382. As can be seen in FIG. 3, consumable core 330 and composite precursor 340 may be formed to produce any form of composite article including complex geometries, airfoils, turbine blades, etc. Infiltrant material may be introduced into composite precursor 340 via any of external block 380, external block 382, external feed block 310, external feed block 314, and consumable core 330, as needed to insure that infiltrant material surrounds all of the fibers of composite precursor 340 and fills all the interstices in a ceramic composite.

Figure 4:
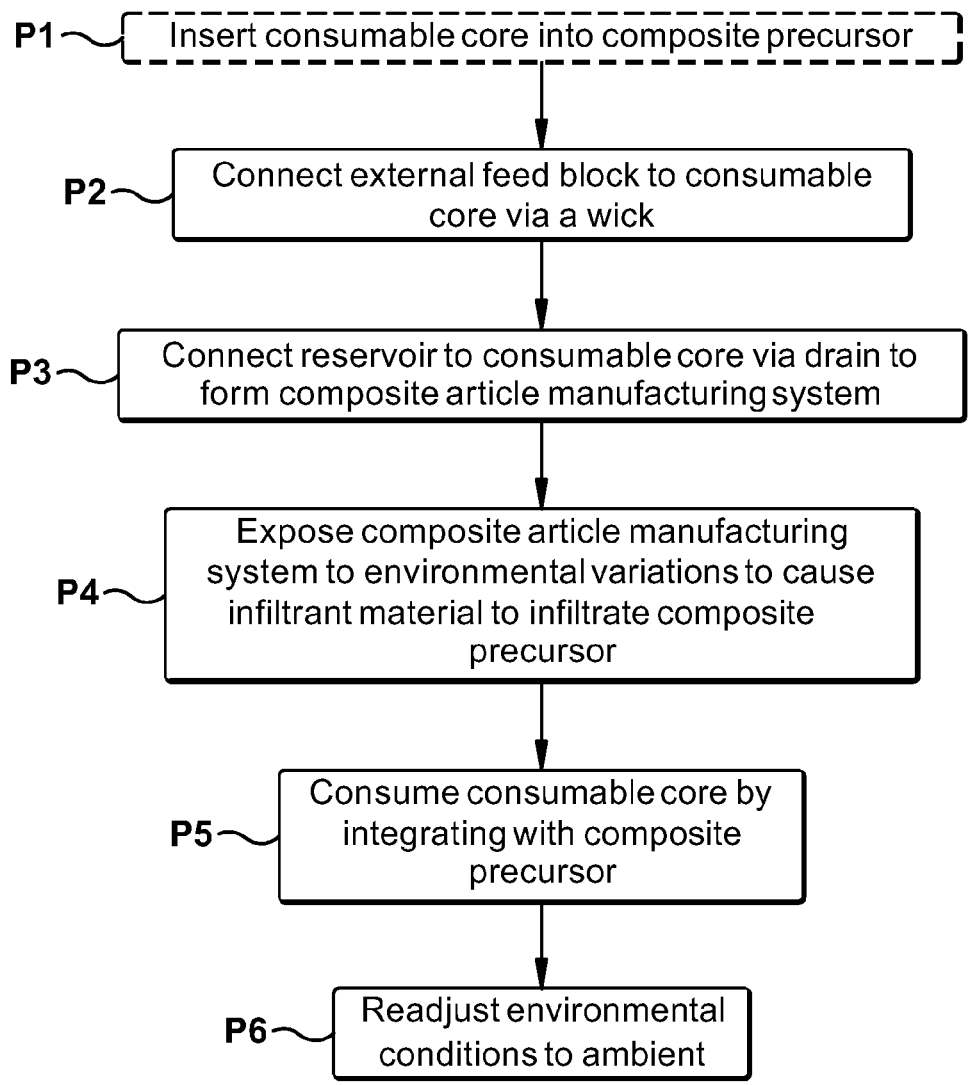
FIG. 4 shows a method flow diagram illustrating a process according to embodiments of the invention.

Turning to FIG. 4, an illustrative method flow diagram is shown according to embodiments of the invention: In preliminary process P1 (shown in phantom), consumable core 130 is disposed within composite precursor 140. Consumable core 130 may be internalized within composite precursor 140, being completely enclosed by composite precursor 140. This may be done by technicians and/or machinery in response to a scheduled or a user prompted manufacturing process. In one embodiment, consumable core 130 may be inserted in composite precursor 140 during assembly of composite precursor 140, with remaining portions of composite precursor 140 being formed after insertion to substantially seal consumable core 130 within. Following process P1, in process P2, an external feed block 110 is connected to consumable core 130 via a wick 112. Following process P2, in process P3, consumable core 130 is connected to a reservoir 120 via a drain 122, thereby forming composite article manufacturing system 100. Following process P3, in process P4, composite article manufacturing system 100 is subjected to a set of environmental adjustments (e.g., a melt infiltration process, an increased temperature, an increased pressure, etc.) which cause consumable core 130 to convert to infiltrant material and begin to infiltrate portions of composite precursor 140. Following process P4, in process P5, consumable core 130 is consumed during the melt infiltration process, integrating with composite precursor 140 to vacate inner/hollow feature 230 and form composite article 200. Following process P5, in process P6, environmental conditions about composite article manufacturing system 100 are readjusted to ambient and wick 112 and drain 122 are disconnected from composite article 200.

The data flow diagram and block diagrams in the FIGURES illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The consumable cores, systems, and methods of the present disclosure are not limited to any one particular composite material, composite article, process, or other system, and may be used with other manufacturing processes and/or systems. Additionally, the consumable cores and systems of the present invention may be used with other systems not described herein that may benefit from the self-consuming, finishing and manufacturing benefits described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
a consumable core configured to be disposed within a hollow feature within a composite precursor, the consumable core completely enclosed by the composite precursor, the consumable core configured to be consumed during a melt infiltration manufacturing process, wherein the consumable core infiltrates the composite precursor, wherein the hollow feature is vacated by the consumable core.

2. The system of claim 1, further comprising an external feed connected to the consumable core via a wick for supplying a flow of infiltrant material to the composite precursor.

3. The system of claim 1, wherein the consumable core includes a cast material.

4. The system of claim 1, wherein the consumable core includes at least one of silicon or boron.

5. The system of claim 1, further comprising an external block disposed proximate the composite precursor for supplying infiltrant material to the composite precursor.

6. A system, comprising:
a composite precursor having a hollow feature; and
a consumable core disposed within the hollow feature of the composite precursor, the consumable core completely enclosed by the composite precursor, the consumable core configured to convert into an infiltrant during a manufacturing process and infiltrate the composite precursor wherein the hollow feature is vacated during the melt infiltration manufacturing process.

7. The system of claim 6, further comprising an external block disposed substantially proximate the composite precursor and adapted to supply additional infiltrant material to infiltrate the composite precursor.

8. The system of claim 6, further comprising a reservoir connected to the consumable core via a drain, the reservoir adapted to receive a flow of infiltrant material from the consumable core.

9. The system of claim 6, wherein the consumable core is formed from sintered powders and includes at least one of silicon and boron.

10. The system of claim 6 further comprising:
an external feed connected to the consumable core via a wick, the external feed adapted to supply a flow of infiltrant material to the composite precursor.

11. The system of claim 6, wherein the composite precursor is porous and carbonized.

12. The system of claim 10, wherein the wick includes woven carbon fiber.

* * * * *